(12) United States Patent
Hagerstrom et al.

(10) Patent No.: US 7,640,406 B1
(45) Date of Patent: Dec. 29, 2009

(54) DETECTING AND MANAGING ORPHAN FILES BETWEEN PRIMARY AND SECONDARY DATA STORES FOR CONTENT ADDRESSED STORAGE

(75) Inventors: Carl F. Hagerstrom, Boulder, CO (US); Thomas Dixon Hutchinson, Boulder, CO (US); Shridhar Bharthulwar, Longmont, CO (US); Paul E. Tinius, Broomfield, CO (US)

(73) Assignee: EMC Corporation, Hopkinton, MA (US)

( * ) Notice: Subject to any disclaimer, the term of this patent is extended or adjusted under 35 U.S.C. 154(b) by 377 days.

(21) Appl. No.: 11/538,307

(22) Filed: Oct. 3, 2006

(51) Int. Cl.
*G06F 12/00* (2006.01)

(52) U.S. Cl. .................. 711/159; 707/10; 707/204; 711/162

(58) Field of Classification Search .......... 711/159, 711/162; 707/201–206, 10, 200
See application file for complete search history.

(56) References Cited

U.S. PATENT DOCUMENTS

| | | | |
|---|---|---|---|
| 5,873,103 | A | 2/1999 | Trede et al. |
| 5,991,753 | A | 11/1999 | Wilde |
| 6,192,375 | B1 | 2/2001 | Gross |
| 6,366,988 | B1 | 4/2002 | Skiba et al. |
| 2004/0163029 | A1 | 8/2004 | Foley et al. |
| 2005/0021566 | A1 | 1/2005 | Mu |
| 2006/0010154 | A1 | 1/2006 | Prahlad et al. |
| 2006/0112096 | A1 | 5/2006 | Ahluwalia et al. |
| 2006/0129537 | A1 | 6/2006 | Torii et al. |
| 2006/0212746 | A1 | 9/2006 | Amegadzie et al. |
| 2007/0083722 | A1 | 4/2007 | Per et al. |
| 2007/0198611 | A1 | 8/2007 | Prahlad et al. |

OTHER PUBLICATIONS

Hagerstrom, et al. U.S. Appl. No. 11/538,351, filed Oct. 3, 2006.
Hagerstrom, et al. U.S. Appl. No. 11/538,316, filed Oct. 3, 2006.
Hagerstrom, et al. U.S. Appl. No. 11/538,313, filed Oct. 3, 2006.
U.S. Appl. No. 11/538, 316, Mail Date Mar. 11, 2008, Office Action.
U.S. Appl. No. 11/538,351, Mail Date Apr. 9, 2008, Office Action.
U.S. Appl. No. 11/538,313, Mail Date Mar. 19, 2008, Office Action.
U.S. Appl. No. 11/538,316, Mail Date Nov. 10, 2008, Final Office Action.
U.S. Appl. No. 11/538,351, Mail Date Aug. 7, 2008, Final Office Action.
U.S. Appl. No. 11/538,351, Mail Date Dec. 22, 2008, Office Action.

(Continued)

*Primary Examiner*—Christian P Chace
*Assistant Examiner*—Mehdi Namazi
(74) *Attorney, Agent, or Firm*—Workman Nydegger

(57) ABSTRACT

A method and system for locating and eliminating orphan files within a secondary storage device. The method includes identifying a secondary file on a secondary storage device, the secondary file being associated with file identification data, wherein the file identification data includes a content address, identifying a placeholder file on a primary storage device, the placeholder file being associated with an offline reference, and determining if the offline reference of the placeholder file validly references the content address of the secondary file.

20 Claims, 7 Drawing Sheets

OTHER PUBLICATIONS

U.S. Appl. No. 11/538,313, Mail Date Oct. 29, 2008, Final Office Action.

Notice of Allowance dated May 1, 2009 as issued in U.S. Appl. No. 11/538,316 filed Oct. 3, 2006.

Notice of Allowance dated Jun. 2, 2009 as issued in U.S. Appl. No. 11/538,351 filed Oct. 3, 2006.

Notice of Allowance dated Apr. 27, 2009 as issued in U.S. Appl. No. 11/538,313 filed Oct. 3, 2006.

DETECTING AND MANAGING ORPHAN FILES BETWEEN PRIMARY AND SECONDARY DATA STORES FOR CONTENT ADDRESSED STORAGE

CROSS-REFERENCE TO RELATED APPLICATIONS

This application is related to U.S. patent application Ser. No. 11/538,313, filed Oct. 3, 2006, and entitled "DETECTING AND MANAGING MISSING PARENTS BETWEEN PRIMARY AND SECONDARY DATA STORES FOR CONTENT ADDRESSED STORAGE," which application is incorporated herein by reference in its entirety.

BACKGROUND

1. The Field of the Invention

The present invention relates to data migration storage systems. More specifically, the present invention relates to methods and systems for locating and eliminating missing parent files and/or orphan files from data migration storage systems.

2. The Relevant Technology

In this society where many personal and business interactions are data driven, the ability to store a large amount of data has become increasingly important. Modern computer systems allow for the interchange of data and resources through network environments. For example, a modern computer network may include a number of interconnected client computers. The computer network may further include resources for storing large amounts of data, including but not limited to, direct attached storage (DAS), network attached storage (NAS), a storage area network (SAN), and other storage environments.

Data migration systems have been developed to facilitate the efficient storage of large amounts of data. For example, a data migration system may include a primary storage location, a secondary storage location, and a policy engine server. The primary storage location is typically used for storing files that are commonly accessed by a client computer, while the secondary storage location is used for storing files that are less commonly accessed by the client computer. The policy engine server is responsible for migrating data files from the primary storage to the secondary storage, and recalling data files from the secondary storage to the primary storage.

In order for a data migration system to function efficiently, certain relationships should exist between the files stored on primary storage and the files stored on secondary storage. When a file is accessed from the primary storage and one or more properties of the accessed file is altered, many of the relationships that should exist between the primary storage and secondary storage can be destroyed or invalidated.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention provide for methods and systems for locating and eliminating orphan files within a secondary storage device. One exemplary method may be practiced in a distributed computing system having a primary storage device, a secondary storage device and a policy engine server, the policy engine server being configured to manage migration of files between the primary and secondary storage devices. An exemplary method for locating and eliminating orphan files within the secondary storage device includes identifying a secondary file on a secondary storage device, the secondary file being associated with file identification data, wherein the file identification data includes a content address, identifying a placeholder file on a primary storage device, the placeholder file being associated with an offline reference, determining if the offline reference of the placeholder file validly references the content address of the secondary file, and marking the secondary file for deletion if the offline reference of the placeholder file does not validly reference the content address of the secondary file. The result is that the orphan file is removed from the secondary storage.

As used herein, the term "data" may include, but are not limited to, directories (e.g., volumes, file systems, and the like), user data, system data, applications, services, operating systems, instructions, and the like, that can be stored on one or more storage devices of a computer. The term "data object" refers to a subset of "data." Data may be organized in logical directories that do not necessarily correspond to a particular storage device.

Certain embodiments described herein will involve electronic communication between a client computer system (hereinafter referred to as a "client") requesting access to a primary storage device. Accordingly, the client sends a request to the primary storage device for access to its system resources, wherein if the client is authorized and validated, the primary storage device responds with a response message providing the desired information. Of course, other messaging patterns between client and primary storage device are available, as are well known in the art.

As used herein, the term "user" may refer to a person operating the client computer. Users are able to access information on the primary storage device. Alternatively, the term "user" may refer to a person operating the policy engine server.

Data Migration System

Figure 1:
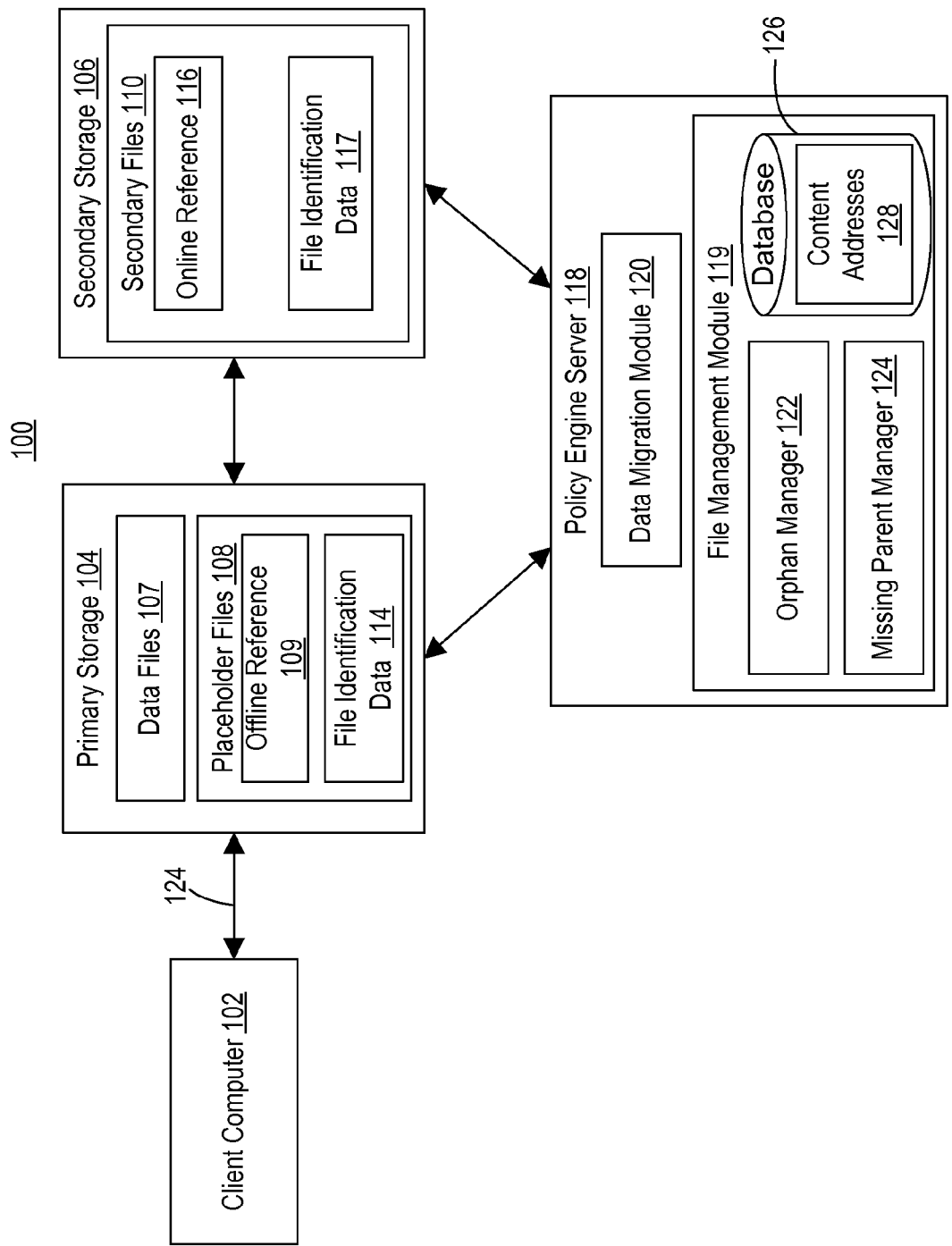
FIG. 1 illustrates an exemplary distributed computer system used for data migration and having a policy engine server for performing missing parent and orphan management functions.

Referring now to FIG. 1, a more detailed example is illustrated using a diagrammed reference to a distributed network 100. The distributed network 100 includes a primary storage device 104, a secondary storage device 106, and a policy engine server 118. Primary and secondary storage devices 104 and 106 communicate with each other to efficiently store data objects 107, 108, and 110. One or more client computers 102 may access the data objects 107, 108, and 110 via a communication link 124 between the client computer and the primary storage 104. Generally, the client computer 102 is blind to the communication between the primary and secondary storage devices 104 and 106.

The policy engine server 118 includes a data migration module 120 used for migrating data between the primary storage device 104 and the secondary storage device 106. The data migration module 120 is configured to automatically move data from primary storage 104 to secondary storage 106 according to a predefined migration policy. In one embodiment, the primary storage device 104 is a faster storage device than the secondary storage device 106, and thus may be more expensive. Therefore, files that are most often used may generally be stored in primary storage 104, while files that are seldom accessed are migrated to secondary storage 106. A file that has been migrated to secondary storage 106 is referred to as an "offline file" or "secondary file" 110, whereas a file residing on primary storage 104 is referred to as an "online file," "primary file" or "data file" 107. Secondary files 110 that have been migrated to secondary storage 106 can later be recalled to primary storage 104.

The types of data objects that can be stored on primary storage 104 include both data files 107 and placeholder files 108. When a data file 107 is migrated and stored as a secondary file 110 on secondary storage 106, the data file 107 is deleted and a small placeholder file 108, commonly referred to as a "stub", is created and stored on the primary storage 104 to assist in locating the secondary file 110. Each placeholder file 108 includes an offline reference 109 which identifies or references the corresponding migrated secondary file 110 on the secondary storage device 106. Each of the secondary files 110 is also associated with an online reference 116. The online references 116 identifies or references the corresponding placeholder file 108 on the primary storage 104. The information contained in the offline reference 109 and online reference 116 depends on the storage scheme of the primary and secondary storage devices 104 and 106. This will be discussed in further detail below.

Thus, a placeholder file 108 is a representation of a data file 107 that has been migrated and is only needed in that situation. Therefore, for a particular data file, generally either a data file 107 or a placeholder file 108 will be stored on primary storage 104, but not both. However, in some cases, as explained below, a data file 107 and placeholder file 108 may reside at the primary storage 104 for a particular data file. Further, more than one placeholder file 108 may exist on primary storage 104 that reference the same secondary file 110 on secondary storage 106.

The client computer 102 may access the online data files 107 directly from the primary storage 104, and may access the offline secondary files 110 via the placeholder file 108 that was created to represent and take the place of a migrated data file (formerly one of the data files 107) and reference the secondary file 110. The primary storage 104 displays the placeholder files 108 along with the data files 107 and a user is generally unaware of the distinction between the data files 107 and placeholder files 108. To access one of the secondary files 110, a user of the client computer 102 selects the corresponding placeholder file 108. The primary storage 104 uses the offline reference 109 in the placeholder file 108 to access the appropriate secondary file 110 from secondary storage 106, the location of the secondary file being identified by the offline reference 109. The placeholder files 108 can be read, modified, deleted or renamed in the same manner as the data files 107. Therefore, online files (i.e., data files 107) and offline files (i.e., secondary files 110) are equally accessible from the perspective of the client computer 102, although it may require slightly more processing time to access an offline file.

Each of the placeholder files 108 and secondary files 110 also include information identifying itself. This information is generally referred to as file identification data 114 and 117. Primary and secondary storage 104 and 106 may include a flat file or database for storing file identification data 114 and 117 that are associated with the particular file. Such file identification data may include filenames. In certain operating systems, such as Unix, data files may be associated with multiple filenames. In situations, such as these, exemplarily, each of the data objects located on the primary storage 104 and the secondary storage 106 may be associated with at least one filename.

In addition, file identification data 114 and 117 can include information identifying a related group of files. In one embodiment, a handle or other unique identifier can be used to identify a related group of files. In one embodiment, a group of related files may include one or more placeholder files 108 on primary storage 104 and one or more secondary files 110 on secondary storage 106. In another embodiment, a group of files includes one or more placeholder files 108 and a single secondary file 110. While each of the placeholder files 108 and/or secondary files 110 in the file group may have different filenames, all of the placeholder files 108 and secondary files 110 in the file group share a common handle which is used to identify the related files in the file group. Therefore, if any question exists as to whether a file on primary storage 104 or secondary storage 106 is related to another file, the handles of both files can be compared to one another. If they share a common handle, then the two files are associated with one another. (Note that data files 107 may also have file identification information such as at least one filename and/or handle.)

Policy engine server 118 also includes file management module 119 to manage various scenarios that occur in the instance of a missing parent or an orphan file. As such, policy engine server 118 includes an orphan manager 122 and a missing parent manager 124 which functionality will be described in detail below. File management module 119 also includes a database 126 that assists in the management of missing parents and/or orphan files. In one embodiment, the database 126 can store content addresses 128 of data objects stored on primary storage 104 and/or secondary storage 106.

The primary and secondary storage devices 104 and 106 may employ various storage schemes. For example, in one embodiment, the primary and secondary storage devices 104 and 106 employ a location addressable storage scheme. Location addressable storage is the typical storage scheme employed by most local and networked storage devices, where each element of data is stored onto a physical medium, and its location is recorded for later use. The storage device often keeps a list, or directory, of these locations. When a request is made to access a location addressable data object, the request typically includes only the location (for example, path and filenames) of the data. The storage device then uses this information to locate and retrieve the data on the physical medium. When new information is written into a location-addressed storage device, it is typically stored in available free space, without regard to its content. The information at a given location can usually be altered or completely overwritten without any special action on the part of the storage device.

Either or both of primary storage 104 and secondary storage 106 can employ location addressable storage. Thus, in embodiments where the secondary storage employs location addressable storage, the offline reference 109 of placeholder files 108 will contain the path of the secondary file 110 located on secondary storage 106. Similarly, where the primary storage 104 employs location addressable storage, the online reference 116 of secondary files 110 will contain the path of the placeholder file 108 located on primary storage 104. Further, where the primary and/or secondary storage 104 and 106 employ location addressable storage, the file identification data 114 and/or 117 will include a handle or other unique identifier.

In another embodiment, the primary and secondary storage devices 104 and 106 employ a content addressable storage scheme. Content addressable storage is a storage scheme for storing information that can be retrieved based on its content as opposed to its storage location. When a data object is stored into a content addressable storage system, the system typically records a content address, which is an identifier based on the information contained in the data object itself. In one embodiment, the content address may be produced by applying a cryptographic hash function, such as MD5, to the content of the data object, and the result is used as the content address.

A request to retrieve information from a content addressable storage system includes identifying the content address of the data object, from which the system can determine the physical location of the data object and retrieve it. Because the content addresses are based on content, any change to a data object will typically also include a change to its content address. Content addressable storage is also referred to as "single instance storage", because a single instance of a data object may be referenced by multiple filenames. Thus, each data object (i.e., data files 107, placeholder files 108, or secondary files 110) will have a single instance of storage that is identifiable using the content address. One exemplary content addressable storage system includes a Centera platform, although other content addressable storage systems may currently exist or may be developed in the future.

Either or both of primary storage 104 and secondary storage 106 may employ content addressable storage. In embodiments where the secondary storage 106 employs content addressable storage, offline reference 109 of the placeholder file 108 includes a content address of the secondary file 110 located on the secondary storage 106. Conversely, where the primary storage 104 employs content addressable storage, the online reference 116 of the secondary file 110 contains the content address of the corresponding placeholder file 108 on the primary storage 104. Further, where the primary storage 104 and/or secondary storage 106 employ content addressable storage, the file identification data 114 and/or 117 will contain the content address of the particular file.

Data objects on a content addressable storage system can be identifiable by performing an itemized scan for the data objects, reviewing the metadata associated with each data object to identify the path/location of the data object. Alternatively, policy engine server 118 can include a database 126 that stores the content addresses 128 of data objects located on primary storage 104 (i.e., data files 107 and placeholder file 108) and/or secondary storage 106 (i.e., secondary files 110). In another embodiment, the content addresses of data objects can be stored on a database located on their respective storage devices.

Thus, combinations of location addressable storage and content addressable storage may exist in the data migration system 100 illustrated in FIG. 1. That is, either or both of primary storage 104 and secondary storage 106 may employ location addressable storage and/or content addressable storage. The information contained in offline path 109, online path 116, and file identification data 114 and 117 will depend on the particular storage scheme, as described above.

In summary, the policy engine server 118 includes a data migration module 120 for managing the efficient storage of data in primary and secondary storage devices 104 and 106. When a data file 107 is migrated from the primary storage 104 to the secondary storage 106, a placeholder file 108 is created in the primary storage 104 to replace the migrated data file 107. The placeholder files 108 are associated with offline references 109 which identify the corresponding migrated secondary files 110. Likewise, the secondary files 110 include online references 116 for identifying the corresponding placeholder files 108. When placeholder files 108 and/or secondary files 110 become disassociated to form missing parents or orphan files, the file management module 119 of the policy engine server 118 operates to resolve these situations.

Figure 2:
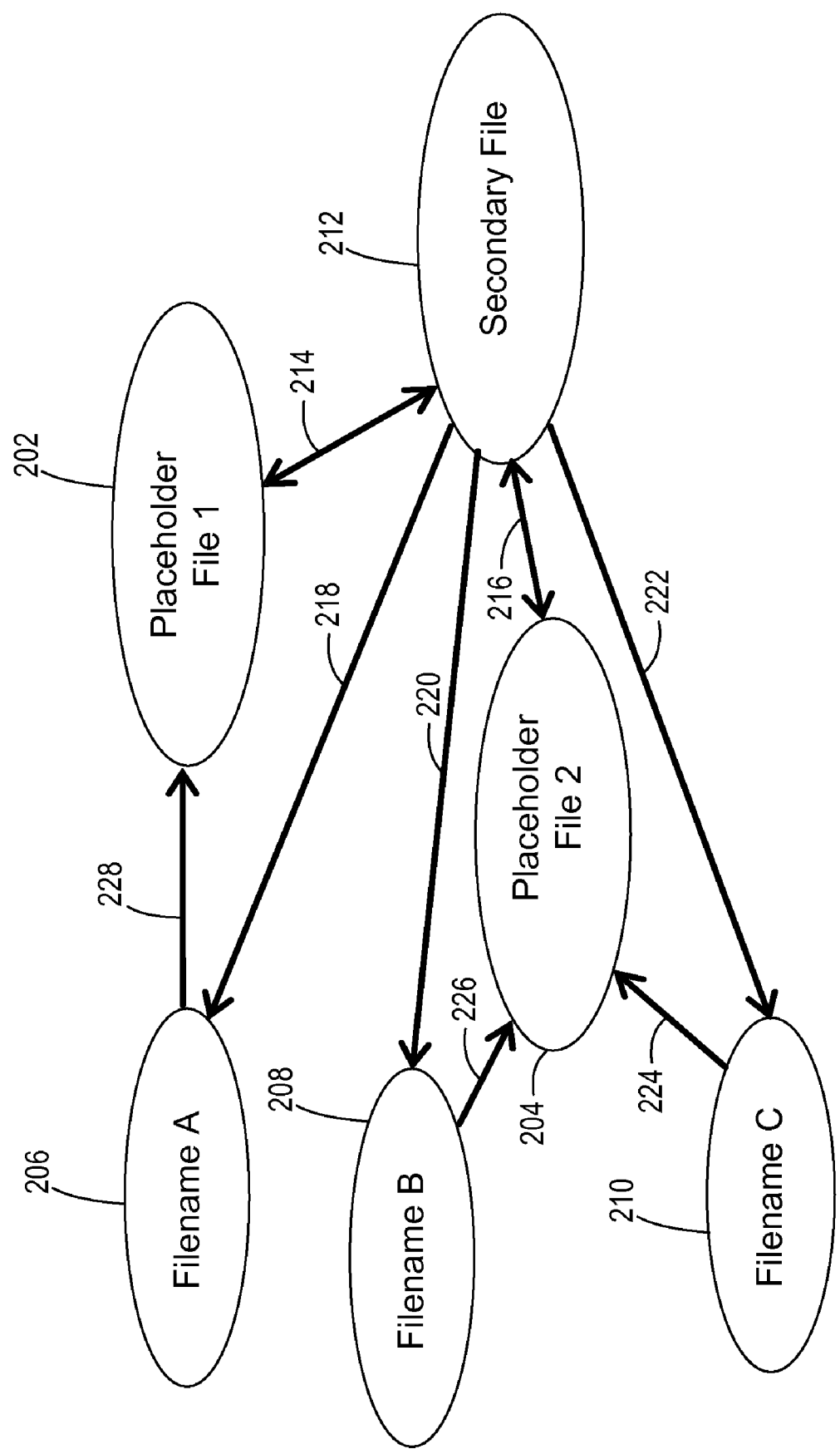
FIG. 2 illustrates an exemplary diagram of the relationship between filenames, placeholder files, and a secondary file.

Referring now to FIG. 2, a more detailed depiction is provided of relationships between placeholder files, secondary files, and file identification data, as employed in the present invention. In this figure, filenames are used to exemplarily represent file identification data. However, other types of file identification data may also be used. As described previously, the placeholder files 202 and 204 are located on the primary storage device 104, and the secondary file 212 is located on the secondary storage device 106. The bidirectional arrows 214 and 216 between the secondary file 212 and the placeholder files 202 and 204 indicate that the placeholder files on the primary storage 104 have a reference to the secondary file 212 on the secondary storage 106. Likewise, the secondary file 212 includes one or more references back to the placeholder files 202 and 204.

As described previously, the references associated with the placeholder files 202 and 204 and the secondary file 212 may be referred to as the offline references and the online references, respectively. For example, in an embodiment where location addressable storage is employed, the references 214 and 216 may include pointers that describe the location (e.g., directory path and filename) of the corresponding placeholder file 202 and 204 or secondary file 212 being referenced. In another embodiment, where content addressable storage is employed, the references 214 and 216 may include a content address of the corresponding placeholder file 202 and 204 or secondary file 212 being referenced.

The unidirectional arrows 218, 220 and 222 indicate that the secondary file 212 contains a database that may contain references to the filenames 206, 208 and 210 on the primary storage device 104 that are associated with the secondary file 212. The unidirectional arrows 224, 226 and 228 illustrate that a relationship exists between the filenames 206, 208 and 210 and the placeholder files 202 and 204 that the filenames identify.

As illustrated in FIG. 2, an instance of a file may be associated with more than one filename. For example, 'Placeholder File 2' 204 is associated with both 'Filename B' 208 and "Filename C' 210. Furthermore, 'Secondary File' 212 is associated with 'Filename A' 206, 'Filename B' 208 and "Filename C' 210. Although not illustrated in FIG. 2, the data files 107 described in FIG. 1 may also be associated with multiple filenames. Associating an instance of a file with multiple filenames is a common practice in Unix systems employing location addressable storage.

As described above, FIGS. 1 and 2 illustrate the relationships that can exist between the files on the primary storage device 104 and the secondary storage device 106 in order for a data migration system to function properly and efficiently. However, when placeholder files 108, 202 and 204 are removed, renamed or restored from backup, or when the secondary files 110 and 212 are recalled from secondary storage 106 to primary storage 104, inconsistencies may develop in the relationships between the files on the primary and secondary storage devices, thereby resulting in "missing parent" and/or "orphan" files. The file management module 119 of the policy engine server 118 is provided, in accordance with the present invention, to locate and eliminate or resolve missing parent and/or orphan files.

Primary Scan

Figure 3:
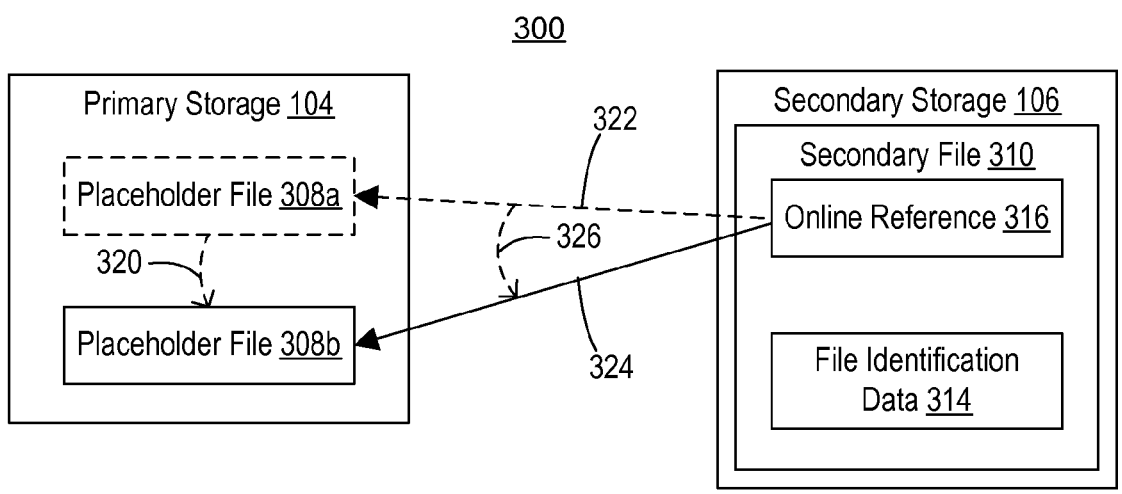
FIG. 3 is a diagram illustrating one example of a missing parent management technique.

The primary scan is performed to locate and resolve missing parent files residing on the primary storage device 104. Missing parent files include placeholder files 108 located on primary storage 104 that are not properly referenced by an online reference 116 of any secondary file 110 located on the secondary storage device 106. FIG. 3 is provided by way of example to illustrate one scenario in which a missing parent placeholder file may result. The original placeholder file 308a was created in a first location when a data file was migrated to the secondary storage 106, thereby creating the secondary file 310. The secondary file 310 is associated with an online reference 316 that identifies the placeholder file 308a. After the placeholder file 308a is created, a user or client system moves the placeholder file from its original location to a second location, as indicated by the dotted arrow 320. However, the online reference 316 associated with the secondary file 310 still identifies the original location of the placeholder file 308a, as indicated by the dotted arrow 322, and does not reference the new placeholder file 308b. Therefore, the placeholder file 308b is considered a missing parent file because reference 322 is not longer valid.

In the embodiment where the primary storage 104 implements content addressable storage, the online reference 316 of secondary file 310 includes a content address for identifying a placeholder file 308 located on the primary storage 104. The effect of the movement of placeholder file 308a to placeholder file 308b is that placeholder file 108b has a different/new content address from the content address of placeholder file 308a. Thus, the secondary file 310 which originally referenced the content address of placeholder file 308a in the online reference 316 does not reference placeholder file 308b.

The missing parent module 124 of the policy engine server 118, illustrated in FIG. 1, is configured to recognize that the placeholder file 308b is a missing parent file. Once the missing parent module 124 recognizes that the placeholder file 308b is a missing parent, the missing parent module updates the online reference of 316 of secondary file 310, as indicated by the dotted arrow 326, so that it properly identifies the placeholder file 308b, as indicated by the arrow 324.

As described previously, the primary and secondary storage devices 104 and 106 may employ various different storage schemes, including location addressable storage and content addressable storage. The process and algorithms for identifying missing parent files differs depending on whether content addressable storage or location addressable storage is being employed by the storage devices 104 and 106. In embodiments where the primary storage 104 implements location addressable storage, the missing parent manager 124 of the policy engine server 118 identifies placeholder files 308 and secondary files 310 that share a common handle. The missing parent manager 124 determines whether the online reference 316 correctly references the placeholder file 308b. That is, whether the online reference 316 includes the correct path of the placeholder file 308b. If the online reference 316 does not correctly reference the placeholder file 308b, the online reference 316 is updated to include the correct reference.

Where a content addressable storage scheme is employed, the missing parent manager 124 of the policy engine server 118 performs a check of the online reference 316 of the secondary file 310 to determine if the online reference properly identifies a content address of a placeholder file 308. If the content address of a placeholder file 308 is not referenced by any secondary file 310, then the missing parent manager 124 identifies the placeholder file 308b as a missing parent file. The placeholder file 308b should have the same offline reference 109 (i.e., path or content address, depending on the storage scheme of secondary storage 106) as the placeholder file 308a, which points back to the secondary file 110. Therefore, the missing parent manager 124 is able to identify a secondary file 310 that corresponds with the missing parent placeholder file 308b. The missing parent manager 124 proceeds to update the content address of online reference 316 of the secondary file 310 so that it properly identifies the content address of placeholder file 308b.

FIG. 3 is merely provided by way of example, and may not represent every scenario in which a missing parent file may be created. Other scenarios may also exist that result in the creation of a missing parent file. For example, a filename associated with the placeholder file may be renamed, thereby causing a change in the content address of the placeholder file. Therefore, the online reference of the corresponding secondary file is updated by the missing parent module 124 so that it includes the correct content address of the placeholder file in order to properly identify the renamed placeholder file.

In another example, the placeholder file may be assigned an additional filename. As described in FIG. 2, a single placeholder file (e.g., 204) may be assigned multiple filenames (e.g., 'Filename B' 208 and 'Filename C' 210). Therefore, in the scenario where the placeholder file is assigned an additional filename, the missing parent module 124 may create an additional online reference associated with the corresponding secondary file so that the newly created filename is properly identified. In addition, the missing parent module 124 may add the newly created filename to the database of filenames and handles (e.g., 114) associated with the secondary file.

In yet another example, a user may delete a placeholder file, and later restore the deleted placeholder file from a backup location. When the placeholder file is restored, it may be restored with a content address that is not identified by the online reference of the corresponding secondary file. Because the placeholder file is not identified by the secondary file's online reference, the placeholder file is a missing parent. Therefore, the missing parent module 124 may update the content address of the placeholder file in the online reference of the secondary file so that it properly identifies the newly restored placeholder file.

Figure 4:
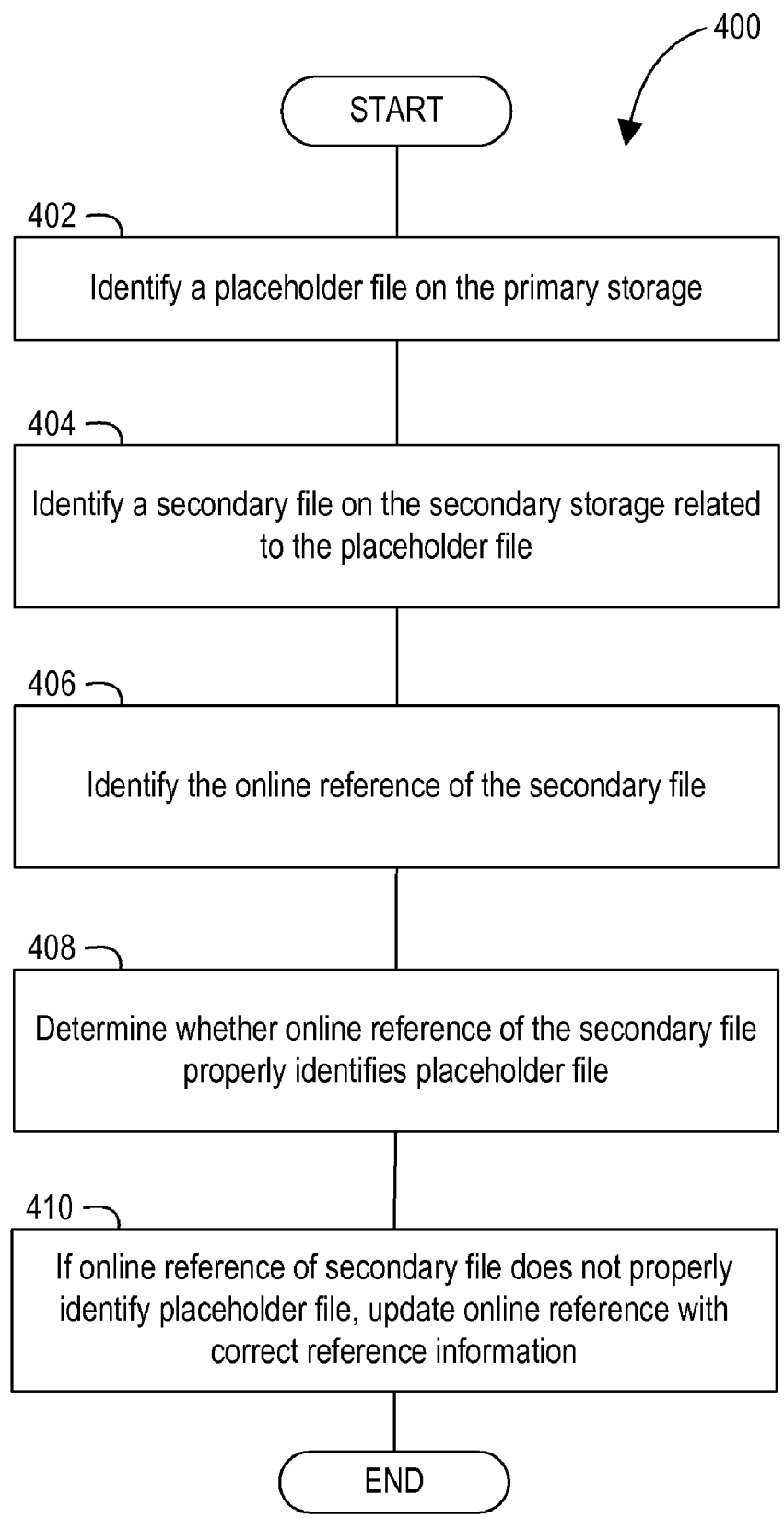
FIG. 4 is a flow diagram illustrating a method for locating and eliminating missing parent files from a primary storage device.

Those skilled in the art will recognize that the present invention may also be described in terms of methods of locating and eliminating missing parent files within primary storage devices employing content addressable storage. Referring now to FIG. 4, a method 400 of locating and eliminating missing parent files within a primary storage device is illustrated. The method 400 may be practiced, for example, in a distributed computing system having a primary storage device, a secondary storage device and a policy engine server. As described previously, the policy engine server may be configured to manage migration of files between the primary and secondary storage devices. The server system may include one or more computer-readable media having computer-executable instructions, that when executed, implement the method 400.

In one embodiment, both the primary storage and secondary storage employ location addressable storage. In another embodiment, one of the primary storage device or secondary storage device employs a content addressable storage scheme, such that the location and content of the primary files are defined by content addresses, while the other employs location addressable storage. In another embodiment, both primary storage and secondary storage devices employ content addressable storage. The information contained in the online reference, offline reference, and file identification data and how that information is accessed differs depending on the storage scheme employed by the primary storage and/or secondary storage.

The method 400 includes, at 402, identifying a placeholder file on a primary storage device. In one embodiment, file management module 119 can perform an item by item scan of each placeholder file in the primary storage 104 before proceeding to the next step. Alternatively, the file management module 119 can identify a first placeholder file and then perform the rest of the method, and then return to 402 to recursively repeat all of the process for a second placeholder file.

At 404, the method includes identifying a secondary file on a secondary storage device related to the placeholder file. In one embodiment, the secondary file can be identified via an offline reference on the placeholder file, using path information where the secondary storage uses location addressable storage or content address information where the secondary storage employs content addressable storage. As illustrated in FIG. 1, the policy engine server 118 may include a database 126 including the content addresses 128 of each of the placeholder files 108 residing on the primary storage 104 and/or secondary files 110 on secondary storage 106. In one embodiment, where the offline reference is a content address, the missing parent manager 124 identifies the secondary file 110 by analyzing the content addresses 128 for secondary files 110 located in the secondary storage 106. The secondary file 110 can also be identified by performing an itemized scan of the data objects on the secondary storage 106, and reviewing the associated metadata with each data object to identify the path or location of the secondary file. In still another embodiment, where both the primary and secondary storage device implement location addressable storage, the missing parent manager 124 may also use the file identification data 114 on the placeholder file 108 to identify a related secondary file 110. For example, the file identification data 114 of the placeholder file 108 may have a handle which can be used to identify a secondary file 110 exhibiting a common handle in its file identification data 117.

At 406, the method includes identifying the online reference of the secondary file associated with the placeholder file. In embodiments where the primary storage employs location addressable storage, identifying the online reference includes determining a path of a placeholder file. In embodiments where the primary storage implements content addressable storage, identifying the online reference includes identifying a content address of a placeholder file.

At 408, the method 400 further includes determining if the online reference of the secondary file properly references the file identification data of the placeholder file. If the online reference of the secondary file does not properly identify the placeholder file, the placeholder file is a "missing parent" and steps should be taken to remedy the situation. In one embodiment, determining whether the online reference of the secondary file properly identifies the file identification data of the placeholder file includes using the online reference data to request access to the primary storage to determine if the pointer back to the primary storage obtains access to the correct placeholder file. If the placeholder file can be accessed by a request using the online reference data, then the online reference data properly identifies the placeholder file. Accessing the placeholder file can further include analyzing the file identification data of the placeholder file to determine if it matches the online reference data of the secondary file.

In one embodiment, where the online reference is a content address, the placeholder file can be accessed by sending the content address contained in the online reference to database 126 of the policy engine server 118 (see FIG. 1). Database 126 includes the content addresses 128 of each of the placeholder files 108 residing on the primary storage 104 enabling access to the placeholder files. In another embodiment, the placeholder file 108 can also be identified using a content address by performing an itemized scan of the data objects on the primary storage 104, and reviewing the associated metadata with each data object to identify the path or location of the placeholder file.

At 410, if the online reference does not properly reference the placeholder file, the method 400 includes updating the online reference of the secondary file so that it includes a proper reference to the placeholder file. Thus, as illustrated in the FIG. 3 example, the online reference is updated, as indicated by the dotted arrow 326, so that instead of identifying invalid reference information, as indicated by the dotted arrow 322, the online reference identifies the proper path or content address of the placeholder file 308b, as indicated by the arrow 324. The method 400 may be repeated for each placeholder file located on primary storage in order to locate and remedy all instances of missing parent files.

Secondary Scan

Figure 5A:
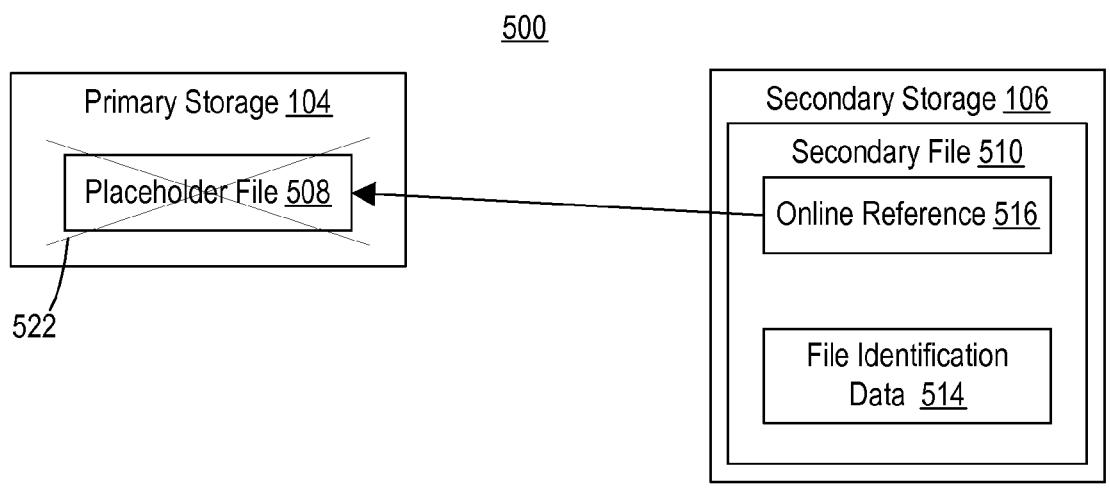
FIGS. 5A, 5B, and 5C are diagrams illustrating various examples of orphan file management techniques.

A secondary scan is performed to locate and eliminate orphan files from the secondary storage device 106. In general, orphan files are secondary files 110 residing on secondary storage 106 that are no longer needed in order for the system 100 to function properly. FIG. 5A is provided by way of example to illustrate one scenario in which an orphan secondary file may result. Originally, the scenario shown in FIG. 5A included a placeholder file 508 which was created in the primary storage device 104 when a data file (not shown) was migrated to secondary storage 106, thus creating the secondary file 510. As described previously, the placeholder file 508 was created with an offline reference (not shown) for identifying the secondary file 510, and the secondary file is associated with an online reference 516 for identifying the placeholder file 508. In this example, a user or client has deleted the placeholder file 508 from the primary storage device 104, as indicated by the cross 522 placed over the placeholder file 508. Consequently, the online reference 516 no longer identifies a valid placeholder file, and is therefore no longer needed since it cannot be accessed by a client system via the placeholder file 508. Therefore, the orphan manager 122 of FIG. 1 recognizes the secondary file 510 as an "orphan file", and marks the secondary file for deletion.

Figure 5B:
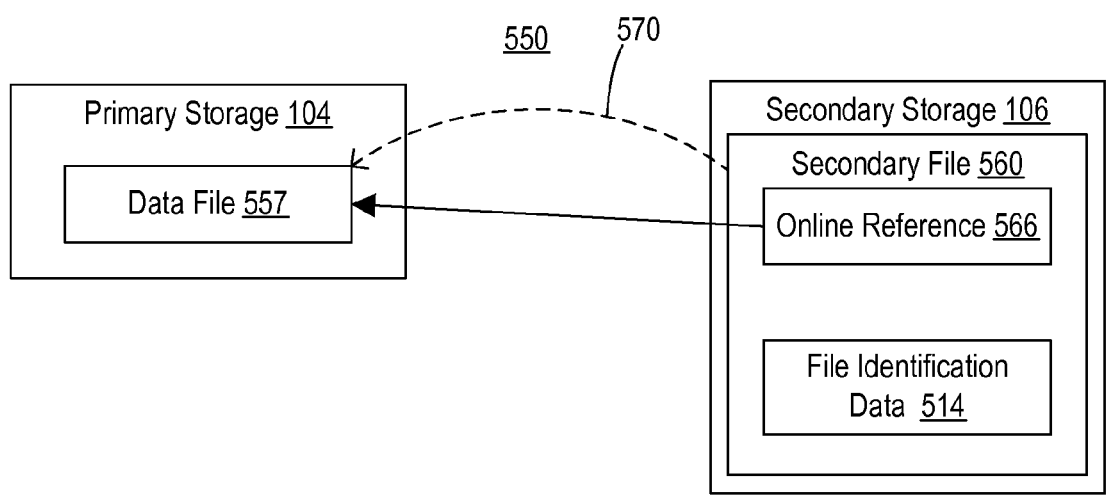

FIG. 5B is provided by way of example to illustrate an alternative scenario in which an orphan secondary file may result. Originally, a placeholder file existed in the place of the data file 557 having an offline reference for identifying the secondary file 560. However, as indicated by the dotted arrow 570, the secondary file 560 has since been recalled from secondary storage 106 to primary storage 104, thus resulting in the data file 557 and in deletion of the placeholder file. Because the data file 557 now exists on the primary storage device 104, there is no need for the secondary file 560, because anytime a client system accesses the data stored in the secondary file, the client can instead access the data file 557 directly. Furthermore, the secondary file is no longer accessible, since the placeholder file is no longer present and no offline reference exists on data file 557 for identifying the secondary file 560. The orphan manager 122 of FIG. 1 recognizes the secondary file 560 as an "orphan file", and marks the secondary file for deletion.

Figure 5C:
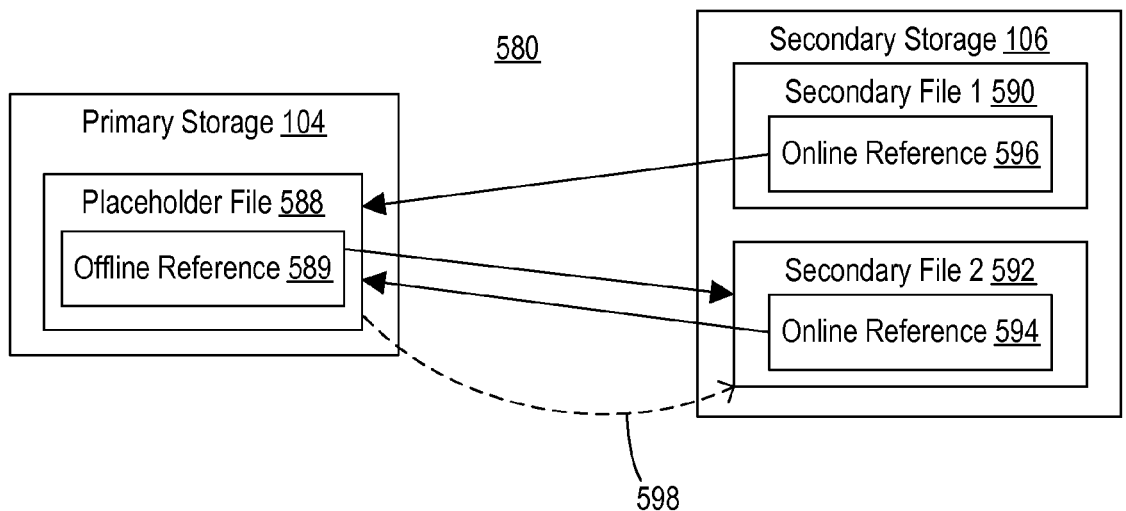

FIG. 5C is provided by way of example to illustrate an alternative scenario in which an orphan secondary file may result. The example of FIG. 5C consists of a first secondary file 590 having an online reference 596 that identifies a placeholder file 588. However, instead of identifying the first secondary file 590, the offline reference 589 of the placeholder file 588 identifies a second secondary file 592. This scenario may occur when a data file (not shown) was originally migrated to the secondary storage device 106, resulting in the placeholder file 588 being created on the primary storage 104 and the first secondary file 590 being created on secondary storage 106. Then, the first secondary file 590 was recalled to the primary storage 104, as is illustrated in FIG. 5B. Subsequently, the resultant data file (not shown) was remigrated to the secondary storage 106, as indicated by the dotted arrow 598, to create the second secondary file 592. Consequently, the placeholder file 588 replaces the remigrated data file, and the placeholder file's offline reference 589 now identifies the second secondary file 592 instead of the first secondary file 590. Likewise, the online reference 594 associated with the second secondary file 592 identifies the placeholder file 588. Therefore, the first secondary file 590 is no longer necessary and is considered an orphan file, because anytime a user or client computer accesses the placeholder file 588, the primary storage 104 will automatically follow the offline reference 589 to the second secondary file 592 instead of to the first secondary file 590. The orphan manager 122 of FIG. 1 recognizes the secondary file 590 as an "orphan file", and marks the secondary file for deletion.

Thus, the orphan manager 122 looks at whether a secondary file is appropriately identified in an offline reference of a placeholder file. If the secondary file is not correctly referenced in any placeholder file, then the secondary file is considered to be an "orphan file." In embodiments where the secondary storage device 106 implements location addressable storage, the path of the secondary file 510, 560, and 590 are not included in an offline reference of a placeholder file. Therefore, the secondary file 510, 560 and 590 are considered to be orphan files. In embodiments where the secondary storage device 106 employs content addressable storage, the content address of the secondary files 510, 560 and 590 are not included in an offline reference of a placeholder file, rendering the secondary files inaccessible.

Prior to permanently deleting the secondary file 510, 560 or 590 from the secondary storage device 106, the orphan manager 122 of FIG. 1 may perform a number of tests to confirm that the secondary file being should be deleted. For example, when the orphan manager 122 first recognizes that a secondary file is an orphan file, the orphan manager may record the time and date at which the orphan file was first identified. The orphan manager 122 may be preprogrammed to wait for a predetermined amount of time after first identifying the orphan file prior to deleting the secondary file 510, 560 or 590 from secondary storage 106. By waiting for the predetermined amount of time prior to deleting the secondary file, the user is given the opportunity to restore the system to a prior state where the secondary file 510, 560 or 590 is not an orphan file. For example, in FIG. 5A, the user may restore the deleted placeholder file 508 from a backup storage location (not shown) to the primary storage device 104.

Another test that the orphan manager 122 may perform prior to deleting the secondary file 510, 560 or 590 from the secondary storage device 104 is to confirm that no other placeholder files exist that contain offline references identifying the secondary file marked for deletion. As described in reference to FIG. 2, multiple placeholder files 202 and 204 may contain offline references 214 and 216 that identify a common secondary file 212. Therefore, it is possible that a first placeholder file 202 may have been deleted (as described in FIG. 5A), but a second placeholder file 204 may still exist that contains a valid offline pointer 216 to the secondary file 212. Therefore, in this circumstance, the orphan manager 122 recognizes that the secondary file 212 is not an orphan file and should not be deleted. In order to ensure that additional placeholder files do not exist containing offline references identifying the secondary file marked for deletion, the orphan manager 122 may search each of the file identification data 514 contained in the secondary storage 106 to ensure that the identification data (e.g., filenames and/or handles) associated with the secondary file marked for deletion are not associated with a placeholder file containing a valid online reference that identifies the secondary file.

FIGS. 5A, 5B and 5C are merely provided by way of example, and may not represent every scenario in which an orphan file may be created. Other scenarios may also exist that may also result in the creation of an orphan file. The orphan manager 122 is configured to find all instances of orphan files and mark them for deletion.

Figure 6:
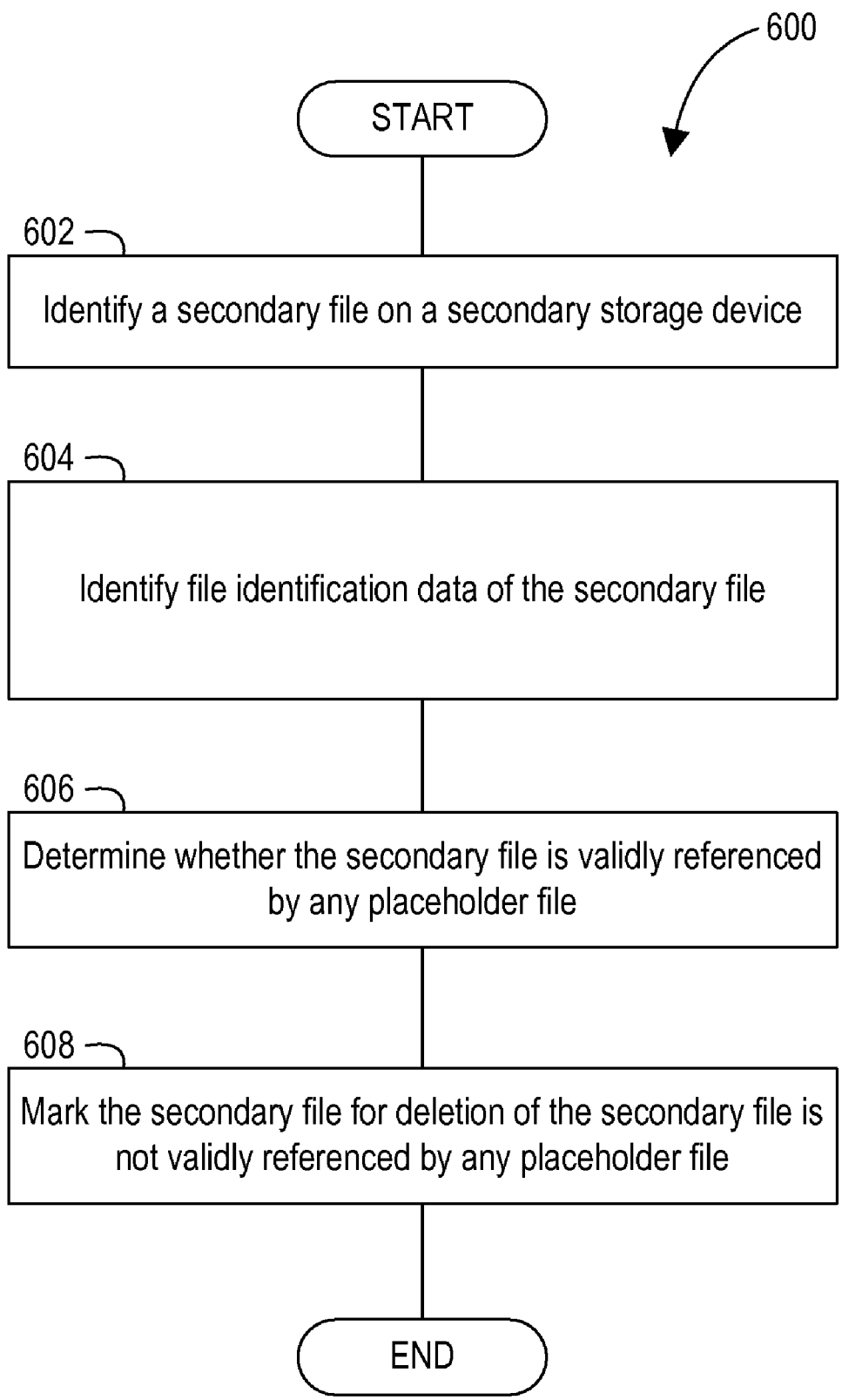
FIG. 6 is a flow diagram illustrating a method for locating and illuminating orphan files from a secondary storage device.

Those skilled in the art will recognize that the present invention may also be described in terms of methods of locating and eliminating orphan files within storage devices employing content addressable storage. Referring now to FIG. 6, a method 600 of locating and eliminating orphan files within a secondary storage device is illustrated. The method 600 may be practiced, for example, in a distributed computing system having a primary storage device, a secondary storage device and a policy engine server. As described previously, the policy engine server may be configured to manage migration of files between the primary and secondary storage devices. The server system may include one or more computer-readable media having computer-executable instructions, that when executed, implement the method 600.

In one embodiment, both the primary storage and secondary storage employ location addressable storage. In another embodiment, one of the primary storage device or secondary storage device employs a content addressable storage scheme, such that the location and content of the primary files are defined by content addresses, while the other employs location addressable storage. In another embodiment, both primary storage and secondary storage devices employ content addressable storage. The information contained in the online reference, offline reference, and file identification data and how that information is accessed differs depending on the storage scheme employed by the primary storage and/or secondary storage.

The method 600 includes, at 602, identifying a secondary file on a secondary storage device. In one embodiment, file management module 119 can perform an item by item scan of each secondary file in the secondary storage 106 before proceeding to the next step. Alternatively, the file management module 119 can identify a first secondary file and then perform the rest of the method, and then return to 602 to recursively repeat all of the process for a second secondary file.

At 604, the method 600 further includes identifying the file identification data of the secondary file. In embodiments where the secondary storage is location addressable storage, the file identification data can include a path and/or handle. In embodiments where the secondary storage implements location addressable storage, identifying the file identification data of the secondary file may include determining the content address of the secondary file, the location and content of the secondary file being determined by its content address. In one embodiment, where the file identification data is a content address, the orphan manager 122 identifies the secondary file 110 by analyzing the content addresses 128 for secondary files 110 located in the secondary storage 106. The secondary file 110 can also be identified by performing an itemized scan of the data objects on the secondary storage 106, and reviewing the associated metadata with each data object to identify the path or location of the secondary file.

The method 600 further includes, at 606, determining if the secondary file is validly referenced by a placeholder file on the primary storage device. If the secondary file is not validly referenced by a placeholder file, then the secondary file is considered an "orphan file." Data may be determined to be invalidly referenced by a placeholder file for a variety of reasons. For example, as previously described in FIG. 5A, if the online reference references a placeholder file that has been deleted since the time at which the secondary file was created, then there is no need to retain the secondary file because it can no longer be accessed by a client system, and therefore the secondary file is marked for deletion.

In another example, as previously described in FIG. 5B, if the online reference references a placeholder file that was originally created to act as a placeholder for a data file that has been restored to the primary storage device since the creation of the secondary file, then there is no need to retain the secondary file, because a client computer can directly access the data file from the primary storage device instead. Therefore, the secondary file is an orphan file and is marked for deletion.

In yet another example, as previously described in FIG. 5C, if the online reference references a placeholder file that instead references an offline reference of a different secondary file, the data file originally associated with the placeholder file was recalled from the secondary storage device, and then remigrated to the secondary storage device. Therefore, the secondary file is an orphan file and is marked for deletion.

Thus, determining whether a secondary file is validly referenced by a placeholder file can include identifying an offline reference of the placeholder. If the offline reference of the placeholder validly points to a secondary file, then the secondary file is not an orphan file. Where the secondary storage is location addressable storage, validly pointing to a secondary file can include that the offline reference of the placeholder file contains a path or handle that matches the path or handle of the secondary file that was previously identified in the file identification data of the secondary file. For secondary storage devices that implement content addressable storage, validly pointing to a secondary file can include that the offline reference of the placeholder file contains a content address of the secondary file that was previously identified in the file identification data of the secondary file. Each placeholder file can be analyzed to determine whether it validly references a secondary file. If the secondary file is not validly referenced by a placeholder file, then it cannot be accessed by a client computer.

If the secondary file is not validly referenced by any placeholder file, at 608, the orphan manager 122 marks the secondary file for deletion. In one embodiment, when the secondary file is marked for deletion, the secondary file is immediately deleted from the secondary storage device. In another embodiment, marking the secondary file for deletion further includes recording the time at which the secondary file is marked for deletion, and then deleting the marked secondary file following the completion of a predefined amount of time (e.g., one month). The predefined amount of time may be programmable by a user of the policy engine server.

In one embodiment, the method 600 may further include determining if any placeholder files located on the primary storage device include offline references identifying the secondary file prior to marking the secondary file for deletion. This step ensures that a secondary file that is associated with multiple placeholder files is not deleted merely because one of the placeholder files is no longer valid.

It will be appreciated that steps of the missing parent process and orphan file management process may overlap and/or preface each other. For example, analyzing secondary files to identify missing parents (e.g., block 404) may occur simultaneously with the analysis of secondary files to identify orphan files (e.g., block 602). Similarly, analyzing placeholder files to identify missing parents (e.g., 402) may be part of the same step for analyzing placeholder files for identifying orphan files (e.g., block 606).

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing system having a primary storage device, a secondary storage device and a policy engine server, the policy engine server being configured to manage migration of files between the primary and secondary storage devices by migrating data files on the primary storage device to the secondary storage device and replacing the data files on the primary storage device with placeholder files, a method for locating orphan files within the secondary storage device that are not properly referenced by placeholder files on the primary storage device, the method comprising:

identifying a secondary file on a secondary storage device, wherein the secondary file corresponds to a data file on a primary storage device that has been replaced with a placeholder file, the secondary file being associated with file identification data, wherein the file identification data includes a content address that references the placeholder file on the primary storage device;

identifying the placeholder file on the primary storage device, the placeholder file including an offline reference that identifies a particular secondary file on the secondary storage device; and determining if the offline reference of the placeholder file validly references the content address of the secondary file, wherein the secondary file is identified as an orphan file on the secondary storage device if the secondary file is different from the particular secondary file identified by the offline reference of the placeholder file.

2. The method as recited in claim 1, further comprising at least one of:

notifying a user of the policy engine server if the offline reference of the placeholder file does not validly reference the content address of the secondary file and indicating the reason for the improper reference; or marking the secondary file for deletion if the offline reference of the placeholder file does not validly reference the content address of the secondary file.

3. The method as recited in claim 1, wherein the offline reference of the placeholder file does not validly reference the content address of the secondary file if the placeholder file has been deleted since the creation of the secondary file.

4. The method as recited in claim 1, wherein the offline reference of the placeholder file does not validly reference the content address of the secondary file if the placeholder file was created to replace a data file that has been restored to the primary storage device since the creation of the secondary file.

5. The method as recited in claim 1, wherein the secondary file is an orphan file when the placeholder file does not exist on the primary storage device.

6. The method as recited in claim 1, wherein marking the secondary file for deletion further includes immediately deleting the secondary file.

7. The method as recited in claim 1, wherein marking the secondary file for deletion further includes:

recording the time at which the secondary file is marked for deletion; and deleting the marked file following a predefined period of time.

8. The method as recited in claim 1, wherein the predefined period of time is programmable by a user of a policy engine server.

9. The method as recited in claim 1, further comprising determining if any other placeholder file located on the primary storage device includes the content address of a secondary file that has been marked deletion.

10. A content addressable data migration storage system for identifying orphan files, comprising:

a primary storage device employing one of location addressable storage or content addressable storage and configured to store and detect placeholder files, wherein the placeholder files replace data files that have been migrated to a secondary storage device, each of the placeholder files including an offline reference for identifying a secondary file;

the secondary storage device employing content addressable storage and configured to store secondary files that are the data files that have been migrated from the primary storage device, each of the secondary files including a content address or a location address and at least one online reference to a placeholder file on the primary storage device; and a policy engine server including a file management module for identifying secondary files that are not identified by any offline references of placeholder files on the primary storage as orphan files wherein orphan files identify secondary files in the secondary storage device that has no corresponding placeholder file in the primary storage device.

11. The system as recited in claim 10, wherein the file management module of the policy engine serve is further configured for performing at least one of:

notifying a user of the policy engine server if the offline reference of the placeholder file does not validly reference the content address of the secondary file; or marking the identified secondary files for deletion.

12. The system as recited in claim 10, wherein identifying secondary files that are not identified by any offline references of placeholder files on the primary storage occurs because a placeholder file having an offline reference including a content address of a secondary file has been deleted.

13. The system as recited in claim 10, wherein identifying secondary files that are not identified by any offline references of placeholder files on the primary storage occurs because a data file has been recalled to the primary storage and a placeholder file having an offline reference including a content address of a secondary file has been deleted.

14. The system as recited in claim 10, wherein identifying secondary files that are not identified by any offline references of placeholder files on the primary storage occurs because a placeholder file that originally referenced a content address of a first secondary file has been changed to include a content address of a second secondary file.

15. The system as recited in claim 10, wherein the file management module is further configured to delete the identified secondary files after the completion of a predetermined period of time.

16. In a distributed computer having a primary storage device, a secondary storage device and a policy engine server, the policy engine server being configured to manage migration of files between the primary storage device and the secondary storage device by migrating data files on the primary storage device to the secondary storage device and replacing the data files on the primary storage device with placeholder files, a computer program product configured to implement a method of locating and eliminating orphan files within the secondary storage device that are not properly referenced by placeholder files on the primary storage device, the computer program product comprising one or more computer readable media having stored thereon computer executable instructions that, when executed by a processor, cause the policy engine server to perform the following:

identify a secondary file on a secondary storage device, wherein the secondary file corresponds to a data file on a primary storage device that has been replaced with a placeholder file, the secondary file being associated with file identification data, wherein the file identification data includes a content address that references the placeholder file identify the placeholder file on the primary storage device, the placeholder file including an offline reference that identifies a particular secondary file on the secondary storage device; and determine if the offline reference of the placeholder file validly references the content address of the secondary file, wherein the secondary file is identified as an orphan file on the secondary storage device if the secondary file is not the particular secondary file identified by the offline reference of the placeholder file.

17. The method as recited in claim 16, wherein the computer executable instructions that cause the server system to determine if the offline reference of the placeholder file validly references the content address of the secondary file further comprise instructions to cause the policy engine server to perform at least one of the following:

notify a user of the policy engine server if the offline reference of the placeholder file does not validly reference the content address of the secondary file and indicating the reason for the improper reference; or mark the secondary file for deletion if the offline reference of the placeholder file does not validly reference the content address of the secondary file.

18. The method as recited in claim 16, wherein the computer executable instructions that cause the server system to determine if the offline reference of the placeholder file validly references the content address of the secondary file further comprise instructions to cause the policy engine server to perform at least one of the following:

wherein the offline reference of the placeholder file does not validly reference the content address of the secondary file if the placeholder file has been deleted since the creation of the secondary file;

wherein the offline reference of the placeholder file does not validly reference the content address of the secondary file if the placeholder file was created to replace a data file that has been restored to the primary storage device since the creation of the secondary file; or wherein the offline reference of the placeholder file does not validly reference the content address of the secondary file if the offline reference of the placeholder file references a different secondary file.

19. The method as recited in claim 16, wherein the computer executable instructions that mark the secondary file for deletion further comprise instructions, that when executed, cause the policy engine server to perform at least on of the following:

immediately delete the secondary file;

record the time at which the secondary file is marked for deletion; or delete the marked file following the completion of a predefined period of time.

20. The method as recited in claim 16, further comprising executable instructions that, when executed, determine if any of other placeholder file located on the primary storage device includes the content address of a secondary file that has been marked for deletion.

* * * * *